Feb. 26, 1957 J. T. IVY 2,782,508
DETACHABLE SIDE MOUNT
Filed May 24, 1954
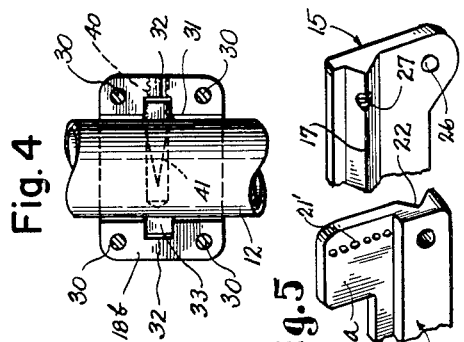
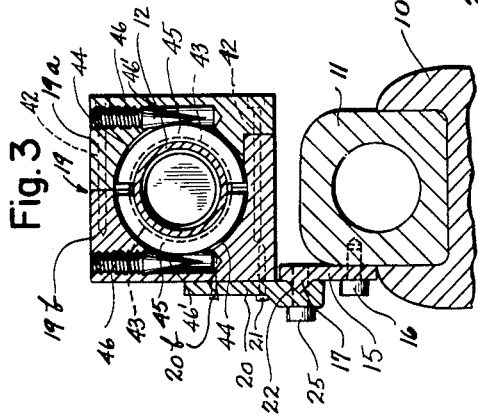
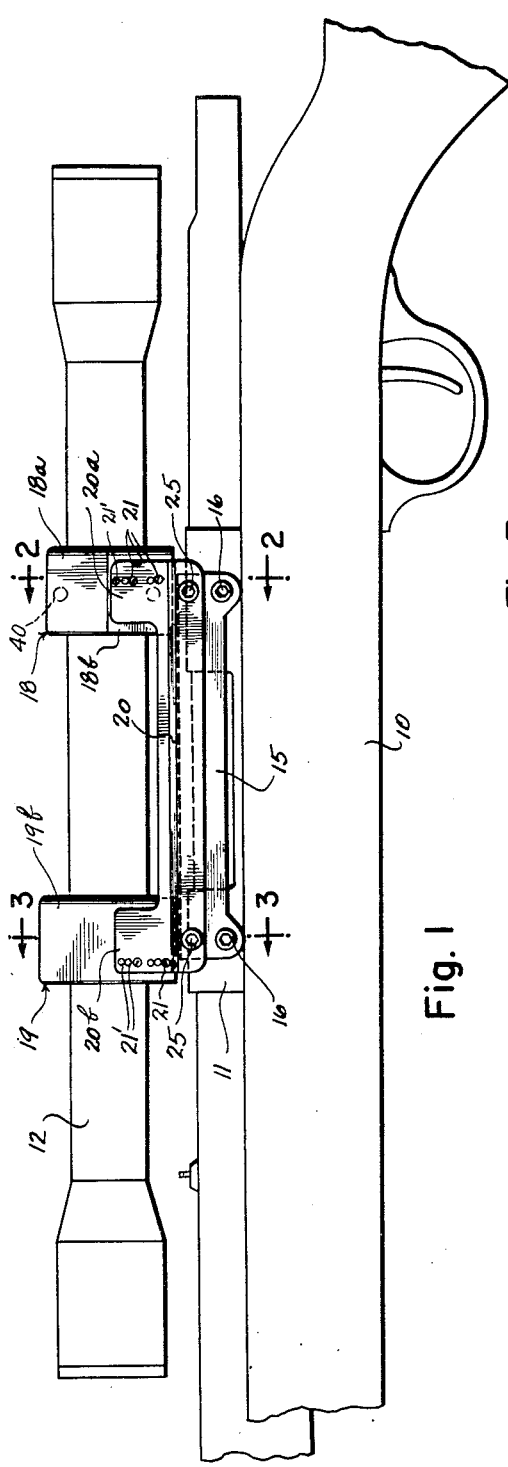
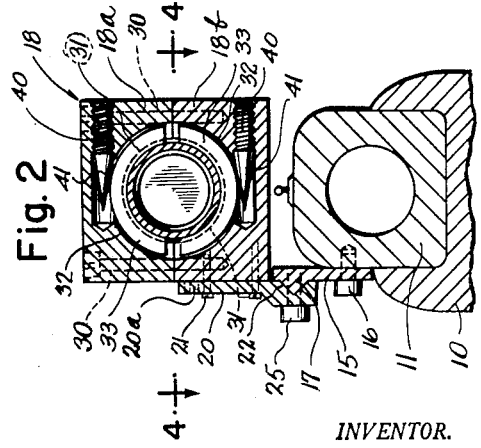
INVENTOR.
Jessie T. Ivy
BY
Cook & Robinson
ATTORNEYS

United States Patent Office 2,782,508
Patented Feb. 26, 1957

2,782,508

DETACHABLE SIDE MOUNT

Jessie T. Ivy, Seattle, Wash.

Application May 24, 1954, Serial No. 431,741

2 Claims. (Cl. 33—50)

This invention relates to telescopes and telescope mounts as employed on fire arms, such as, for example, hunting rifles, and it has reference more particularly to telescope mounts of those types which are known as "detachable side mounts."

It is the principal object of the present invention to provide telescope mountings which are readily applicable to the ordinary types of rifles, and which provide for the quick and easy removal of the telescope from the rifle when such is desired, and which also provide for the ready and accurate replacement of the telescope without requiring "sighting in" or any adjustment in so far as the mounting itself is concerned.

It is also an object of the present invention to provide telescope mounting plates which may be individually applied to a number of guns which may be of various kinds, and to equip a telescope with a carrier plate that may be applied to the mounting plate of any of the guns, thus providing that the telescope can be interchangeably used with any of the plate equipped guns.

It is also an object of the present invention to provide a side mount that supports the telescope sight above the gun barrel and in the clear of the line of sights as originally provided on the rifle so that the latter sights may be used whenever desired without necessitating the removal of the telescope from the gun.

It is also an object to provide a mount including clamp blocks in which the telescope is held and which includes means within the blocks for "sighting in" adjustment of the telescope sight.

Further objects and advantages of the present invention reside in the details of construction and in the combination of parts and in their mode of use, as will hereinafter be fully described.

In accomplishing these and other objects of the invention, I have provided the improved details of construction the preferred forms of which are illustrated in the accompanying drawings, wherein:

Fig. 1 is a side view of a portion of a typical hunting rifle, as equipped with a telescope sight that is supported by a detachable side mounting that embodies the improvements of the present invention therein.

Fig. 2 is a vertical cross-section, taken on the line 2—2 in Fig. 1.

Fig. 3 is a vertical cross-section, taken on the line 3—3 in Fig. 1.

Fig. 4 is a cross-section on line 4—4 in Fig. 2.

Fig. 5 is a perspective of parts of the mounting and carrier plate.

Referring more in detail to the drawings:

10 designates a part of the gun stock; 11 designates the barrel mounting frame and 12 designates a typical present day form of "telescope sight" with a cylindrical body portion. The gun frame 11 extends longitudinally of the stock 10 and, as noted in Figs. 2 and 3, a longitudinal portion thereof, above its horizontal axial plane, is exposed above the stock.

Fixed to an exposed side surface portion of the frame and extending therealong, is a flat vertically disposed plate 15 hereinafter referred to as the "mounting plate."

The mounting plate 15 is rigidly secured to the frame 11 preferably by screw bolts 16 and 16 that are passed through holes 16a in the opposite end portions thereof and threaded into the frame, as shown in Figs. 2 and 3. Ordinarily, the plate 15 is about six or seven inches long and preferably it extends about one-fourth inch above the horizontal plane of the top surface of the frame, but as noted in Figs. 2 and 3, is disposed at one side of the frame. Formed lengthwise of the plate 15, and on its outer face, and parallel with its top edge and with the barrel, is a V-shaped ridge or rib 17. Preferably this rib extends the full length of the plate, but not necessarily so. Its purpose will presently be understood when explained in connection with the securement of the carrier plate.

The mounting means for the telescope comprise two clamping and telescope adjusting means; these being designated in their entireties, respectively, by reference numerals 18 and 19. Each block, in transverse cross-section, is of the rectangular, or square form shown in Figs. 2 and 3, and each block is centrally divided to provide separable and coacting clamping portions between which the telescope barrel is received and adjustably held. The oppositely related portions of each of the blocks 18 and 19 have adjacent surface portions thereof semi-cylindrically recessed to receive and hold the barrel of the telescope 12 between them as shown in Figs. 1, 2 and 3 and as presently explained.

The two blocks 18 and 19 are spaced longitudinally of the telescope barrel, as shown in Fig. 1, and are joined in this spaced relationship by a flat, vertically disposed plate 20 which is hereinafter referred to as the "carrier plate." This carrier plate 20 has upwardly projecting, flat wing portions, 20a and 20b, at its opposite ends that are disposed flatly against side face portions of the blocks 18 and 19, and rigidly attached thereto by any suitable means such as by screws 21. The lower longitudinal edge portion of the carrier plate 20 overlaps with the longitudinal upper edge portion of the mounting plate 15, along the outside thereof, and it is provided in its inside surface, with a V-shaped channel 22 that receives the V-shaped rib 17 of the plate 15 therein in a close, firm fit, as shown in Figs. 2 and 3. Screw bolts 25—25 are passed through holes 26 provided therefor in the lower edge portions of the carrier plate 15, near its ends, and are threaded into holes 27 provided therefor in the top edge portion of plate 15, thus to rigidly secure the plates 15 and 20 together and mount the telescope 12 directly above and extended along the frame; the relationship of the telescope to frame being as shown in Fig. 2 wherein it is noted that there is substantial clearance between the clamping blocks 18 and 19 and the top of the frame; thus providing unobstructed view of the gun sights for sighting when such is desired.

The mounting blocks 18 and 19 which, respectively, are designated as the forward and rearward blocks, are made substantially in accordance with the mountings that have been described and illustrated in my copending application filed on July 27, 1953, under Serial No. 370,274. The forward block 18 provides means therein for lateral adjustment of the forward end of the telescope. Likewise, the rearward block provides means therein for the elevational adjustment of the telescope as has been explained in the copending application above mentioned.

Assuming then that the rifle frame or even the barrel has been equipped with the side mounting plate 15, as has been described and herein illustrated, and that the two mounting blocks 18 and 19 in the manner shown, and that the carrier plate 20 has been rigidly attached thereto, as illustrated, it will then be understood that when the two plates assembled with edges overlapped, as in Fig. 2, and secured together by the screw bolts 25, as shown, the telescope will be held rigidly in its position of use on the rifle. The spaced relationship of the blocks 18 and 19, above the top surface of the frame provides that sighting of the gun by use of the iron sights provided thereon, can be done if occasion arises.

It is further to be understood that if at any time it is desired that the telescope be removed, this can be easily and quickly done merely by removal of the two screw bolts 25 from the two plates. Then, when it is again desired to use the telescope, it can be quickly applied and secured in place by use by fitting the V-shaped rib 17 of the plate 15 in the complemental channel 22 of plate 20, and applying the screw bolts 25. In this way, the parts are brought back to their original setting and it is not necessary that they again be adjusted or the telescope sighted in before it is ready for use.

As was previously explained, the clamping and adjusting mounts, 18 and 19, are substantially like those which are illustrated in my copending application, filed under Serial No. 370,274.

Referring first to Fig. 2, the block 18 here is shown to be horizontally divided through its axial center thus providing the upper and lower complemental portions 18a and 18b, designated as the cap and base portions respectively.

The cap portion, 18a, is removably attached to the base portion 18b by a plurality of screws 30 that project downwardly through holes in the cap portion and are threaded into holes provided therefor in the base portion. The engaging surfaces of the base and cap portions are formed with complemental, semi-cylindrical seats, 31, between which the telescope barrel is received. Each of these seats is formed with a circumferentially directed channel 32 in which an arcuately curved bushing 33 is contained; the two, oppositely disposed bushings being fitted tightly against the telescope barrel. The channels 32 are of such depth that the bushings can be adjusted vertically therein to a limited extent for slight raising or lowering of that end of the telescope.

The vertical adjustment of the bushings is effected by two adjusting screws 40—40, that are threaded into horizontal bores of the parts 18a and 18b. The inner end portions of the screws 40 are conically tapered as at 41 and engage, respectively, with the outer surfaces of the bushings 33 above and below the telescope. By the inward and outward adjustment of these screws, the bushings can be shifted up and down and the elevation of that end of the telescope can be adjusted accordingly.

Likewise, the block 19 which carries the forward end portion of the telescope is divided vertically to provide the cap portion 19a and base portion 19b. The cap portion is held in place by screws 42. The base portion and cap portion are formed, as in block 18, with complemental, semi-cylindrical seats 43, and each of these seats is formed with circumferentially directed channels 44 containing cylindrically curved bushings 45 fitted to opposite sides of the telescope barrel. The bushings 45 are adjustable laterally in their channels for lateral adjustment of that end of the telescope, and this adjustment is effected by the vertically applied screws 46—46 with conically tapered inner end portions 46' that engage the oppositely disposed bushings in the same manner as the screws 40 of the rear block engage the bushings 33.

The provision for this adjustment of telescope in the blocks is for "sighting in" and is not an adjustment that is frequently made or required.

To provide for a certain amount of adjustment in spacing of the telescope above the barrel and frame, the carrier plate ends 20a and 20b are formed with a series of vertically spaced holes 21' as shown in Fig. 5, to receive the screws 21. This adjustment takes care of variation as height of sights as provided on the gun barrel.

The present mount is simple in construction; easy to apply; is usable with all ordinary types or rifles and does not interfere with use of the original gun sight. It provides for easy and quick application of the telescope to a gun and its quick and easy removal.

Having thus described my invention, what I claim as new therein and desire to secure by Letters Patent is:

1. In combination with a gun having a frame portion and a barrel mounted thereby; a detachable telescope mounting means comprising a mounting plate that is rigidly fixed to said frame to extend in a vertical plane along said barrel and at one side thereof, a carrier plate extended along the mounting plate with its lower edge portion overlapped with the top edge portion thereof, telescope mounting blocks applied to the forward and rearward end portions of said carrier plate and adapted to be fixed thereto at different positions of vertical adjustment, for support of a sighting telescope along the gun barrel and spaced thereabove, screws rotatably applied through the overlapping portion of the carrier plate and threaded into the mounting plate to functionally secure them together; said screws being removable from the plates for the detachment of the carrier plate and telescope from the gun; the overlapped surfaces of said plates being formed, respectively, with a single longitudinal ridge and a single longitudinal groove fitted one within the other, and whereby the relationship of said plates, when functionally secured together by said screws, is definitely established.

2. The combination with a gun having a frame and a barrel carried therein, of a detachable telescope mounting means comprising a flat mounting plate that is fixed to the frame to extend along the barrel at one side thereof in a vertical plane; said mounting plate being formed adjacent its top edge and on its outer face with a longitudinal V-shaped ridge, a carrier plate extending along the mounting plate in a vertical plane, with its lower edge portion overlapped with the top edge portion of the mounting plate formed in its inner face with a longitudinal groove that seats the ridge of the mounting plate therein, said overlapping portion of the carrier plate having holes therethrough and clamp screws applied through said holes in the carrier plate and threaded into the underlying portion of the mounting plate to fixedly secure said plates together and establish their relationship when thus secured together, said carrier plate having a row of vertically spaced holes in each of its opposite end portions, telescope mounting blocks applied to said carrier plate at its opposite ends and at the inside thereof to mount a telescope over and along the barrel, screws applied through selected holes of the vertical rows and into the blocks to fix them to the plate at predetermined elevation over the barrel, said screws as applied through the carrier plate and threaded into the mounting plate being removable for the detachment of the carrier plate and telescope from the gun.

References Cited in the file of this patent

UNITED STATES PATENTS

| | | |
|---|---|---|
| 2,018,961 | Kuhn | Oct. 29, 1935 |
| 2,407,977 | English | Sept. 24, 1946 |
| 2,526,126 | Gagnier | Oct. 17, 1950 |
| 2,583,260 | Felix | Jan. 22, 1952 |
| 2,624,946 | Miller | Jan. 13, 1953 |
| 2,629,176 | Ivy | Feb. 24, 1953 |